United States Patent Office 3,740,431
Patented June 19, 1973

3,740,431
PYRIMIDINE FUNGICIDE
Margaret Claire Shephard, Maidenhead, and Brian Kenneth Snell, Twyford, England, assignors to Imperial Chemical Industries Limited, London, England
No Drawing. Filed Jan. 28, 1970, Ser. No. 6,566
Claims priority, application Great Britain, Feb. 6, 1969, 6,469/69
Int. Cl. A01n 9/22
U.S. Cl. 424—251                            1 Claim

ABSTRACT OF THE DISCLOSURE

The compound 5-n-butyl-4-hydroxy-6-methyl-2-methylaminopyrimidine and fungicidal uses of this compound.

This invention relates to a pyrimidine derivative and to method for combating plant fungal diseases.

In our co-pending application No. 14,271/66 we have described fungicidal compositions comprising, as an active ingredient, a pyrimidine derivative.

According to the invention we provide the compound having the formula:

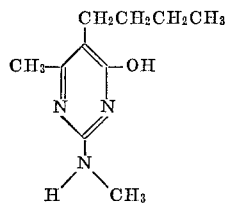

and functional derivatives thereof.

The compound can form numerous functional derivatives, including for example salts, ethers or esters and the invention, therefore, further provides such functional derivatives.

Thus, for example the 4-hydroxypyrimidine compound of the invention may be etherified to form a compound having an ether group comprising an alkyl, hydroxyalkyl, aralkyl, alkenyl, alkoxycarbonylalkyl, alkylcarbonyl, alkylaminoalkyl or alkylthioalkyl residue.

Carboxylic, sulphonic and carbonic esters, for example, may be formed from the pyrimidine compound of the invention by treatment with carboxylic acid halides, sulphonyl halides and chloroformates, respectively. Preferably such treatment is carried out in an alkaline medium. Esters which may be prepared include the following:

p-toluenesulphonate ester,
ethyl carbonate ester,
benzoate ester,
p-nitrobenzoate ester,
methylsulphonate ester,
cinnamate ester.

The salts of the pyrimidine derivative may be basic or acid salts. Suitable basic salts include alkali metal salts, for example the sodium and potassium salts, or salts of noble metals, for example silver salts, or ammonium salts. Other suitable metal derivatives include the bi-pyrimidinyl-mercury and the mercuri-chloride derivative. Suitable acid salts include salts formed from organic or inorganic acids. Organic acids which may be used include:

para-toluenesulphonic acid,
2,4,6-trinitrobenzenesulphonic acid,
3,5-dinitrobenzoic acid,
trichloroacetic acid,
oxalic acid,
citric acid,
picric acid.

Inorganic acids which may be used include:

hydrochloric acid,
hydrobromic acid,
nitric acid,
sulphuric acid,
phosphoric acid,
fluoroboric acid,
thiocyanic acid,
perchloric acid.

A preferred salt is an alkali metal salt or a hydrohalide especially the latter. A salt which is a hydrochloride of the pyrimidine derivative is particularly preferred. Ethers and esters of the pyrimidine compound of the invention will form salts with acids, including the acids listed above.

The pyrimidine derivative is, for convenience, referred to throughout the present specification and claims as having the formula:

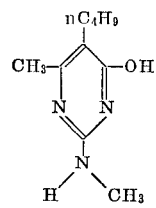

The compound, however, also exists with tautomeric structures of the following form:

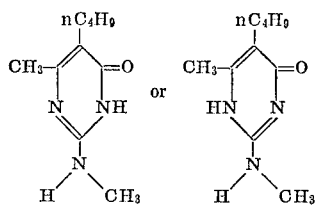

and the present invention is to be understood as including the tautomeric forms of the compound.

The pyrimidine compound and its functional derivatives possess fungicidal activity against a variety of fungal diseases including the following specific diseases:

*Puccinia recondita* (brown rust) on wheat,
*Sphaerotheca fuliginea* (powdery mildew) on cucumber,
*Erysiphe graminis* (powdery mildew) on wheat and barley,
*Podosphaera leucotricha* (powdery mildew) on apple,
*Uncinula necator* (powdery mildew) on vine,
*Plasmopara viticola* (downy mildew) on vine.

The compound and its functional derivatives show particularly useful anti-fungal activity against the two last mentioned diseases of the above list. In this respect, as will be shown hereinafter, their activity is superior to that of compounds specified in our co-pending application No. 14,271/66, referred to above.

Satisfactory results are generally obtained using a formulation containing 500 p.p.m. of the fungicidally active compound. Often useful results may be obtained using even lower concentrations; in particularly favourable cases compositions containing as little as 5 p.p.m. active ingredient may have a fungicidal effect.

A particularly useful feature of the activity of the pyrimidine is its systemic effect. It moves in the plant and can be taken up by roots to combat fungal infection in foliage.

The invention, therefore, further provides a pesticidal composition comprising as an active ingredient a compound having the formula:

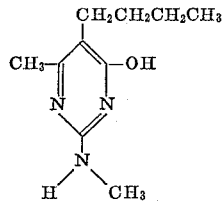

or a functional derivative thereof.

The compositions may comprise as a functional derivative, a salt, ether or an ester of the compound and especially an acid addition salt, a metal salt or an ammonium salt.

The fungicidal compound, derivatives and compositions of the invention can be used to combat plant pathogens in a number of ways. Thus they can be applied to the foliage of an infected plant, or to seeds, or the soil in which plants are growing or to be planted.

The invention, therefore, in a further aspect provides a method of combating plant pathogens which comprises applying to the foliage of an infected plant, or to seeds, or to soil in which plants are growing or to be planted a compound having the formula

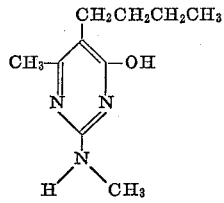

or a functional derivative thereof, as hereinbefore defined.

In a preferred aspect the invention provides a means of combating fungal infestations in plants which comprises applying to the locus of the plant a compound or composition as herein defined.

The compound, its derivatives and compositions may be used for agricultural and horticultural purposes and the type of derivatives or composition used in any instance will depend upon the particular purpose for which it is to be used.

In choosing salts or esters for use in treating plants, either by application to the soil or directly onto the plant, a factor which should be taken into account is the relative phytotoxicity of the particular acid from which the salt or ester is derived. This problem is however minimized by the fact that normally only very small amounts of the salt or esters of the pyrimidine derivative need to be used to achieve a fungicidal effect and undesired phytotoxic effects can therefore be, in general, avoided by reducing the amount of active ingredient used.

The compositions may be in the form of dusting powders or granules wherein the active ingredient is mixed with a solid diluent or carrier. Suitable solid diluents or carriers may be for example, kaolin, bentonite, kieselguhr, dolomite, calcium carbonate, talc, powdered magnesia, fuller's earth, gypsum, Hewitt's earth, diatomaceous earth and china clay. Compositions for dressing seed, for example, may comprise an agent assisting the adhesion of the composition to the seed, for example a mineral oil.

The compositions may also be in the form of dispersible powders or grains comprising, in addition to the active ingredient, a wetting agent to facilitate the dispersions of the powder or grains in liquids. Such powders or grains may include fillers, suspending agents and the like.

The compositions may also be, and preferably are, in the form of liquid preparations to be used as soil drenches, sprays or dips which are generally aqueous solutions, dispersions, or emulsions containing the active ingredient, if desired in the presence of one or more wetting agents, dispersing agents, emulsifying agents, suspending agents or corrosion inhibitors (e.g. lauryl isoquinolinium bromide). Water or organic liquids may be used to prepare solutions, dispersions or emulsions of the active ingredient and aqueous solutions of the salts of the invention are particularly preferred compositions.

Wetting agents, dispersing agents and emulsifying agents, if used, may be of the cationic, anionic or non-ionic type. Suitable agents of the cationic type include, for example, quaternary ammonium compounds, for example cetyltrimethyl-ammonium bromide. Suitable agents of the anionic type include, for example soaps, salts of aliphatic monoesters of sulphuric acid, for example sodium lauryl sulphate, salts of sulphonated aromatic compounds, for example sodium dodecylbenzene-sulphonate, sodium, calcium or ammonium lignosulphonate, butylnaphthalene sulphonate, and a mixture of the sodium salts of diisopropyl- and triisopropyl-naphthalenesulphonic acids. Suitable agents of the non-ionic type include, for example the condensation products of ethylene oxide with fatty alcohols such as oleyl alcohol or cetyl alcohol, or with akyl phenols such as octylphenol, nonylphenol and octylcresol. Other non-ionic agents are partial esters derived from long chain fatty acids and hexitol anhydrides, the condensation products of the said partial esters with ethylene oxide, and the lecithins. Suitable suspending agents are, for example, hydrophilic colloids, for example polyvinylpyrrolidone and sodium carboxymethylcellulose and the vegetable gums, for example gum acacia and gum tragacanth.

The aqueous solutions, dispersions or emulsions may be prepared by dissolving the active ingredient or ingredients in water or an organic solvent which may, if desired, contain one or more wetting, dispersing or emulsifying agents and then, in the case when organic solvents are used, adding the mixture so obtained to water which may, if desired likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example, for improving the distribution, adhesive power and resistance to rain on treated surfaces, the different compositions can be better adapted for the various uses for which they are intended.

The pyrimidine compound of the invention and its derivatives may also be conveniently formulated by mixing them with fertilizers. A preferred composition of this type comprises granules of fertilizer material incorporating, for example coated with, a salt of the pyrimidine compound. The fertilizer material may, for example, comprise nitrogen or phosphate containing substances.

The compositions which are to be used in the form of aqueous solutions, dispersions or emulsions are generally supplied in the form of a concentrate containing a high proportion of the active ingredient or ingredients, and the concentrate is diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.001% and 10.0% by weight of active ingredient or ingredients may be used.

It is to be understood that the fungicidal compositions of this invention may comprise, in addition to the pyrimidine compound or its derivatives, one or more other compounds having biological activity.

The invention also provides a method of preparing 5-n-butyl 4-hydroxy-6 - methyl - 2 - methylaminopyrimidine wherein methylguanidine or a salt thereof is condensed with ethyl n-butyl acetoacetate, optionally in the presence of a base.

The invention also provides a method of preparing the said pyrimidine by reacting a 2-alkylthio-5-n-butyl-4-hydroxy-6-methyl pyrimidine with a methylamine salt. The reaction is preferably carried out by fusing the two reactants together.

The 2 - alkylthio - 5 - n- butyl - 4 - hydroxy - 6 - methylpyrimidine is preferably 5-n-butyl-4-hydroxy-6-methyl-2-methylthio pyrimidine.

Salts, esters and ethers may be made from the pyrimidine compound by known standard techniques for the preparation of such derivatives.

The invention is illustrated in various aspects by the following examples, those numbered 1–9 exemplifying methods of preparing the pyrimidine compound and its derivatives while those numbered 10–17 are illustrative of fungicidal compositions containing the pyrimidine and derivatives as active ingredients. In the latter group all references to percentage amounts of constituents are by weight and are based on the weight of the composition as a whole. Example 18 shows the use of the pyrimidine compound in killing phytopathogenic fungi.

EXAMPLE 1

The compound 5 - n- butyl - 4 - hydroxy - 6 - methyl-2-methylamino pyrimidine having the formula:

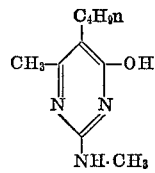

was prepared as follows:

A mixture of 5-n-butyl-4-hydroxy-6-methyl-2-methylthiopyrimidine (4.38 g.) and methylamine acetate (25 ml.) was heated under reflux for three hours. The reaction mixture was poured into ice-water, and the precipitate which formed was filtered off, washed with a little cold water, and dried. Recrystallisation from isopropanol-water gave colourless needles, M.P. 167° C. (3.94 g., 81%).

Analysis.—Found (percent): C, 62.0; H, 8.9; N, 21.9. $C_{10}H_{17}ON_3$ requires (percent): C, 61.5; H, 8.7; N, 21.6.

EXAMPLE 2

The compound 5-n-butyl-4-hydroxy-6-methyl-2-methylaminopyrimidine having the formula:

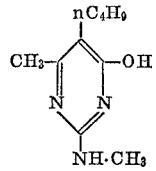

was prepared by the following method.

Ethyl 2-n-butylacetoacetate (1 mole) and methylguanidine carbonate (1 mole) were heated together under reflux at 150° for 24 hours. The mixture was cooled, and the solid produced was filtered off, washed with ether, and then dissolved in 5% aqueous sodium hydroxide solution.

The alkaline solution was treated with decolourising charcoal, filtered, and the filtrate acidified with acetic acid. The product was filtered off and dried. After four recrystallisations from isopropanol-water, colourless needles of 5 - n-butyl-4-hydroxy-6-methyl-2-methylaminopyrimidine M.P. 167° C., were obtained (yield: 42%).

EXAMPLE 3

5-n-butyl-4-(2 - diethylaminoethoxy)-6-methyl-2-methylamino pyrimidine having the formula:

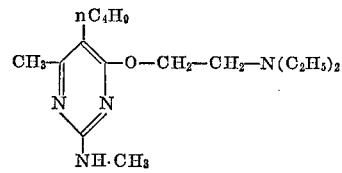

was prepared as follows:

Sodium (0.46 g., 0.02 mole) was dissolved in 2-diethylaminoethanol (30 g.). To the solution was added 5-n-butyl - 4 - chloro-6-methyl-2-methylaminopyrimidine (0.02 mole), and the reaction mixture stirred at 130–140° for 3 hours. Excess of 2-diethylaminoethanol was removed in vacuo, and the residue dissolved in a mixture of methylene chloride and water. The methylene chloride layer was dried ($Na_2SO_4$) and the solvent removed.

EXAMPLE 4

This example illustrates the preparation of the hydrochloride of 5-n-butyl-6-hydroxy-4-methyl-2-methylamino pyrimidine. 5-n-butyl-6-hydroxy-4-methyl-2-methylamino pyrimidine (10 g.) was mixed thoroughly with concentrated hydrochloric acid of specific gravity 1.18. There was thereby obtained a powder comprising 5-n-butyl-6-hydroxy-4-methyl - 2 - methylamino pyrimidine hydrochloride (11.7 g.). This was recrystallised using isopropyl alcohol/benzene.

EXAMPLE 5

This example illustrates the preparation of an aqueous solution of the hydrochloride of 5-n-butyl-6-hydroxy-4-methyl-2-methylamino pyrimidine. 5-n-butyl-6-hydroxy-4-methyl-2-methylamino pyrimidine (10 g.) was added to water (10 ml.) and concentrated hydrochloric acid was added (3.8 g.). The resultant mixture was then warmed to 50° C. and held at this temperature until a clear solution was obtained. After cooling, water (40 ml.) was added and the solution then contained 29.3% by weight of 5-n-butyl-6-hydroxy-4-methyl-2-methylamino pyrimidine in the form of the hydrochloride thereof.

EXAMPLE 6

This example illustrates the preparation of an aqueous solution of the nitric acid salt of 5-n-butyl-6-hydroxy-4-methyl-2-methylamino pyrimidine. 5-n-butyl-6-hydroxy-4-methyl-2-methylamino pyrimidine (10 g.) is dissolved in water (30 ml.) and nitric acid added (4.3 g. of a 70% w./v. solution). The mixture was warmed until all the solid had dissolved and then water (100 ml.) was added to yield a solution containing 13.1% w./v. of 5-n-butyl-6-hydroxy-4-methyl-2-methylamino pyrimidine in the form of the nitric acid salt thereof.

EXAMPLE 7

In a similar manner to that described in Example 6 aqueous solutions of the sulphuric acid and phosphoric acid salts, respectively, of 5-n-butyl-6-hydroxy-4-methyl-2-methylaminopyrimidine were obtained, using corresponding molar amounts respectively, of sulphuric acid and phosphoric acid instead of nitric acid. The resultant solutions contained 12.3% w./v. and 14.7% w./v. respectively, of the sulphuric and phosphoric acid salts of 5-n-butyl-6-hydroxy-4-methyl-2-methylamino pyrimidine.

EXAMPLE 8

This example illustrates the preparation of the potassium salt of 5-n-butyl-6-hydroxy - 4 - methyl-2-methylamino pyrimidine.

5 - n- butyl - 6 - hydroxy - 4 - methyl - 2 - methylamino pyrimidine (4 g.) was dissolved in absolute ethanol (30 ml.) with warming and the resultant solution added to a solution of potassium hydroxide (1.16 g.) in absolute ethanol (25 ml.). The mixture was stirred for one hour at room temperature and the solvent then evaporated off leaving a solid which was dried at 100° C. over phosphorus pentoxide. The solid was the potassium salt of 5-n-butyl-6-hydroxy-4-methyl-2-methylamino pyrimidine.

EXAMPLE 9

This example illustrates the preparation of the sodium salt of 5-n-butyl-6-hydroxy - 4 - methyl-2-methylamino pyrimidine.

5 - n- butyl - 6 - hydroxy - 4 - methyl - 2 - methylamino pyrimidine (4 g.) was dissolved in absolute ethanol (30 ml.) with warming and the resultant solution added to a solution of metallic sodium (0.44 g.) in absolute ethanol (25 ml.). The mixed solutions were warmed to 50° C. for one hour whereafter the solvent was removed by evaporation leaving a white solid consisting of the sodium salt of 5-n-butyl-6-hydroxy - 4 - methyl - 2-methylamino pyrimidine which was dried at 100° C. over phosphorus pentoxide.

EXAMPLE 10

This example illustrates the preparation of a water-soluble powder comprising 50% by weight of the hydrochloride salt of the pyrimidine of the invention as the active ingredient.

The entire amount of the product produced by the method of Example 4 was ground together with potassium chloride (6.2 g.) to yield a powder which dissolves rapidly in water.

EXAMPLE 11

This example illustrates the preparation of a soluble powder comprising the potassium salt of the pyrimidine derivative of the invention as the active ingredient.

The potassium salt of 5-n-butyl-6-hydroxy-4-methyl-2-methylamino pyrimidine (2.47 g.) prepared according to Example 8, was mixed and ground with potassium sulphate (1.53 g.) to yield a powder which dissolves rapidly in water.

EXAMPLE 12

This example illustrates the preparation of a fungicidal composition in the form of an aqueous solution containing 1.2% by weight of the salt prepared in Example 8.

The potassium salt of 5-n-butyl-6-hydroxy-4-methyl-2-methylamino pyrimidine (2.47 g.) prepared according to Example 8 is dissolved in water (200 ml.).

EXAMPLE 13

This example illustrates the preparation of a fertilizer composition comprising as active ingredient 5-n-butyl-6-hydroxy-4-methyl-2-methylamino pyrimidine. The active ingredient was dissolved in trichloroethylene and "Trilac" added to this solution. The mixed solutions were then sprayed onto the fertilizer and the trichloroethylene was evaporated off. The proportions of the constituents in the product were as follows:

| | Percent |
|---|---|
| I.C.I. No. 2 fertilizer | 97.9 |
| Product of Example 1 | 0.3 |
| "Trilac" 25/40 (registered trademark. "Trilac" 25/40 is a 40% solution of an alkyd resin in trichloroethylene.) | 1.8 |

In the following examples the words: "Lubrol," "Aromasol," "Dispersol," "Lissapol," "Cellofas" are trademarks and their constitution, in general, is as follows:

"Lubrol" L is a condensate of 1 mole of nonyl phenol with 13 molar proportions of ethylene oxide.

"Aromasol" H is a solvent mixture of alkylbenzenes.

"Dispersol" T is a mixture of sodium sulphate and a condensate of formaldehyde with the sodium salt of naphthalene sulphonic acid.

"Lubrol" APN 5 is a condensate of 1 mole of nonyl phenol with 5½ moles of ethylene oxide.

EXAMPLE 14

An emulsion concentrate was made up by mixing together the ingredients set out below in the proportions stated and stirring the mixture until all the constituents were dissolved.

| | Percent |
|---|---|
| Product of Example 1 | 10 |
| Calciumdodecylbenzenesulphonate | 5 |
| Ethylene dichloride | 40 |
| "Lubrol" L | 10 |
| "Aromasol" H | 35 |

EXAMPLE 15

A composition in the form of grains readily dispersible in water was prepared by grinding together the first three of the ingredients listed below in the presence of added water and then mixing in the sodium acetate. The resultant mixture was dried and passed through a British Standard mesh sieve, size 44–100, to obtain the desired size of grain.

| | Percent |
|---|---|
| Product of Example 8 | 50 |
| "Dispersol" T | 25 |
| "Lubrol" APN 5 | 1.5 |
| Sodium acetate | 23.5 |

EXAMPLE 16

The active ingredient (product of Example 1) was dissolved in a solvent and the resultant liquid was sprayed onto the granules of fuller's earth. The solvent was then allowed to evaporate to produce a granular composition.

| | Percent |
|---|---|
| Product of Example 1 | 5 |
| Fuller's earth granules | 95 |

EXAMPLE 17

A composition suitable for use as a seed dressing was prepared by mixing all three of the constituents set out below in the proportions stated.

| | Percent |
|---|---|
| Product of Example 2 | 50 |
| Mineral oil | 2 |
| China clay | 48 |

EXAMPLE 18

Compositions containing 5-n-butyl-4-hydroxy-6-methyl-2-methylamino pyrimidine were made up in the following manner and tested against various plant fungal diseases.

Compositions according to the invention were made up in the following manner and tested in different ways against various foliar-borne fungal diseases. The procedure adopted for each test is described below.

An aqueous solution or suspension containing 500 parts per million (p.p.m.) of the compound under test and suitable either for drenching the soil surrounding growing plants, or for spraying onto the leaves of cucumber, vine or apple plants is obtained by adding water to a solution of the compound (200 mg.) in acetone (1 ml.) until the total volume of the mixture is 400 ml. An aqueous solution or suspension suitable for spraying onto the leaves of wheat, or barley plants is prepared similarly, but instead of water, a 0.1% volume/volume aqueous solution of the polyoxyethylenesorbitan monolaurate wetting agent, "Tween" 20, is used ("Tween" is a trademark).

A. Spray-applied Protectant Test (P.S.A.)

A suspension or solution containing 500 p.p.m. of the active compound was sprayed directly onto the leaves of plants, a wetting agent being used when the plant was wheat or barley. After 24 hours the plant was inoculated with the fungus under test and after a suitable period of time (time interval A—see table below) depending upon the particular plant and fungus, the extent of infection was assessed visually.

B. Drench-applied Protectant Test (P.R.D.)

A suspension or solution containing 500 p.p.m. of the active compound was applied to the soil surrounding the plant under test, and 48 hours later the plant was inoculated with the fungus. The extent of infection was assessed visually after a period of time (time interval B—see table below) depending upon the plant and the fungus.

C. Spray-applied Eradicant Test (E.S.A.)

The plants were inoculated with the fungus under test, and 24 hours later the liquid preparation containing 500 p.p.m. of the active compound was sprayed onto the leaves of the plants as described under A above. After a further period of time (time interval C—see table below), again depending upon the particular plant and fungus, the extent of infection was assessed visually.

| Disease and plant | Time interval (days) | |
| --- | --- | --- |
| | A and B | C |
| Puccinia recondita (wheat) | 10 | |
| Sphaerotheca fuliginea (cucumber) | 7 | 6 |
| Erysiphe graminis (wheat) | 7 | 6 |
| Erysiphe graminis (barley) | 7 | 6 |
| Podosphaera leucotricha (apple) | 10 | 9 |
| Uncinula necator (vine) | 10 | 9 |
| Plasmopara viticola (vine) | 7 | |

The results of the tests are set out in the table below the amount of disease being expressed as a grading giving the percentage amount of disease:

Grading:    Percentage amount of disease
0 ............................................ 61 to 100
1 ............................................ 26 to 60
2 ............................................ 6 to 25
3 ............................................ 0 to 5

TABLE I

| Disease | PSA | PRD | ESA |
| --- | --- | --- | --- |
| Puccinia recondita (rust on wheat) | 2 | — | 0 |
| Sphaerotheca fuliginea (powdery mildew on cucumber) | 3 | 3 | 3 |
| Erysiphe graminis (powdery mildew on wheat) | 3 | 3 | 3 |
| Erysiphe graminis (powdery mildew on barley) | 3 | 3 | 3 |
| Podosph aeraleucotricha (powdery mildew on apple) | 3 | — | 1 |
| Uncinula necator (powdery mildew on vine) | 2 | — | 2 |
| Plasmopara viticola (downy mildew on vine) | 3 | — | 0 |

—=not tested.

In a further test the invention compound was applied at the rate of 500 p.p.m. to young vine plants against the diseases Plasmopara viticola (vine downy mildew) and Uncinula necator (vine powdery mildew), and compared with the fungicidal compounds known by the British Standard Common names dimethirimol and ethirimol and having the structures:

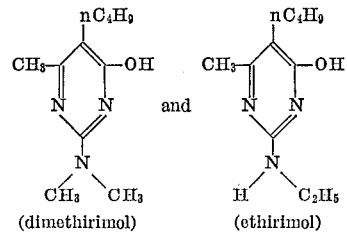

TABLE II

| Compound | Uncinula necator (powdery mildew) P.S.A. | Plasmopara viticola (downy mildew) P.S.A. |
| --- | --- | --- |
| (Invention compound) | 3 | 2 |
| Dimethirimol | 0 | 0 |
| Ethirimol | 1 | 0 |

These results clearly indicate the advance represented by the present invention.

The compounds dimethirimol and ethirimol are specified in our co-pending U.K. application No. 14,271/66 referred to above.

We claim:

1. A method of combating plant fungi which comprises applying to the foliage of an infected plant, or to seeds, or to soil in which plants are growing or to be planted a fungicidally effective amount of a compound having the formula:

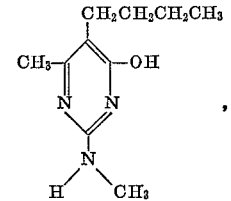

a fungicidally active acid addition salt thereof, or a sodium, potassium, ammonium, silver or mercuric salt thereof.

References Cited

UNITED STATES PATENTS 3,577,543    5/1971    Baranyovits et al. ____ 424—251
3,259,623    7/1966    Kober et al. _____ 424—251

FOREIGN PATENTS 11,148    1963    Japan _____ 424—251

SAM ROSEN, Primary Examiner
V. D. TURNER, Assistant Examiner

U.S. Cl. X.R.
424—DIG. 8